US006774335B2

(12) United States Patent
Yanobe et al.

(10) Patent No.: US 6,774,335 B2
(45) Date of Patent: Aug. 10, 2004

(54) PLASMA REACTOR AND GAS MODIFICATION METHOD

(75) Inventors: Takeshi Yanobe, Kanagawa (JP); Hideyuki Fujishiro, Saitama (JP); Kenji Dosaka, Saitama (JP); Minoru Torii, Saitama (JP); Kazuo Ando, Saitama (JP); Koji Kotani, Saitama (JP)

(73) Assignees: Hokushin Corporation, Kanagawa (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/849,340

(22) Filed: May 7, 2001

(65) Prior Publication Data

US 2002/0005395 A1 Jan. 17, 2002

(30) Foreign Application Priority Data

May 12, 2000 (JP) ....................................... 2000-140223
May 12, 2000 (JP) ....................................... 2000-140287
May 12, 2000 (JP) ....................................... 2000-140294
May 12, 2000 (JP) ....................................... 2000-140300

(51) Int. Cl.[7] ................................................ B23K 10/00
(52) U.S. Cl. ............................ 219/121.43; 219/121.52; 219/121.4; 156/345.48

(58) Field of Search ........................ 219/121.43, 121.52, 219/121.4; 156/345.48, 345.43; 204/172, 165, 170, 157.43, 177; 118/723 I, 723 IR; 216/68; 134/1; 423/352; 123/DIG. 10; 60/274

(56) References Cited

U.S. PATENT DOCUMENTS

| | | | | |
|---|---|---|---|---|
| 6,038,853 | A * | 3/2000 | Penetrante et al. | 60/274 |
| 6,238,525 | B1 * | 5/2001 | Lox et al. | 204/177 |
| 6,284,105 | B1 * | 9/2001 | Eliasson et al. | 204/165 |
| 6,471,932 | B1 * | 10/2002 | Gieshoff et al. | 423/352 |

FOREIGN PATENT DOCUMENTS

| | | | |
|---|---|---|---|
| JP | 6-106025 | 4/1994 | B01D/53/36 |

* cited by examiner

*Primary Examiner*—Quang T. Van
(74) *Attorney, Agent, or Firm*—Sughrue Mion, PLLC

(57) ABSTRACT

This invention provides a plasma reactor for modifying gas by plasma, including a first planar electrode and a second planar electrode, the two electrodes facing opposite each other approximately in parallel; a dielectric body inserted between the first and the second electrodes; and a complex barrier discharge-generating way for providing a predetermined electric potential difference between the first and the second electrodes; wherein the first and the second electrodes are provided so as to apply complex plasma discharge to the gas to be treated fed between the electrodes, to thereby modify the gas. According to the invention, gas modification efficiency can be remarkably improved.

36 Claims, 20 Drawing Sheets

MAP OF ELECTRIC FIELD DISTRIBUTION

PLASMA REACTOR AND GAS MODIFICATION METHOD

BACKGROUND OF THE INVENTION

1. Field of the Invention

The present invention relates to a plasma reactor for performing gas modification reaction so as to synthesize or decompose gas, and to a method for modifying gas. More particularly, the invention relates to a plasma reactor and a method for modifying gas for performing gas modification reaction with high efficiency by employing complex plasma discharge.

2. Background Art

Conventionally, there have been known gas modification methods employing discharge.

An example of the known methods is a method for plasma-treating a contaminant gas of a harmful substance; e.g., $NO_X$, VOC (volatile organic compound) gas, or ethylene by employing silent discharge so as to purify the gas.

The aforementioned silent discharge is a type of discharge which is attained by applying AC high voltage to two planar electrodes which face opposite each other and which sandwich a dielectric layer formed of an insulating substance. The silent discharge uniformly disperses between the electrodes even at ambient pressure.

Among the methods for modifying gas by plasma, typically employed methods are categorized, in accordance with the nature of the plasma induced between the electrodes, into the following two types:

1. Gas modification methods employing localized and concentrated discharge such as corona discharge, glow discharge, or arc discharge, which is induced by applying voltage between a pair of electrodes facing opposite each other, and
2. Gas modification methods employing barrier discharge, which is induced by forming a dielectric body on at least a metallic electrode surface and, subsequently applying voltage between the electrodes.

Japanese Patent Application Laid-Open (kokai) No. 6-106025 discloses an exhaust-gas-purifying apparatus for removing NO contained in exhaust gas. The exhaust-gas-purifying apparatus employs an exhaust-gas-purification catalyst and a plasma reactor in combination. In fact, there are disclosed (ibid.) one apparatus employing a plasma reactor in which lightning-like concentrated discharge is induced through the application of AC voltage between a pair of electrodes, and another apparatus employing a plasma reactor in which barrier discharge is induced by applying AC voltage between a pair of electrodes, at least one of which is coated with a dielectric body.

However, concentrated discharge of high plasma energy density disadvantageously attains contact with a reaction gas at low probability. In contrast, barrier discharge that attains contact with reaction gas at high probability has a disadvantageously low plasma energy density.

SUMMARY OF THE INVENTION

In view of the foregoing, the present inventors have conducted extensive studies in an effort to elevate the plasma energy level over a region between the electrodes, and have found that the collision frequency of molecules of a gas introduced for treatment can be enhanced by complex barrier discharge; i.e., combination of mist-like barrier discharge and lightning-like localized and concentrated discharge, to thereby enhance the gas reaction efficiency.

Accordingly, in one aspect of the present invention, there is provided a plasma reactor for modifying gas by plasma, characterized by comprising

- a first planar electrode and a second planar electrode, the two electrodes facing opposite each other approximately in parallel;
- a dielectric body inserted between the first and the second electrodes; and
- a complex barrier discharge-generating means for providing a predetermined electric potential difference between the first and the second electrodes; wherein the first and the second electrodes are provided so as to apply complex plasma discharge to the gas to be treated fed between the electrodes, to thereby modify the gas.

The ratio of the width (W) to the length (L) of the first and second electrodes may be predetermined in accordance with modification reaction of the gas to be treated, the width (W) being approximately perpendicular to the direction for feeding the gas to be treated and the length (L) being along the direction.

The relationship between W and L may be adjusted to $W \geqq L$ when the modification reaction is a single-step reaction, or the relationship between W and L may be adjusted to $W \leqq L$ when the modification reaction includes multiple reaction steps.

Positions of voltage application to the first and the second electrodes may be offset from a central position with respect to the direction of the flow of the gas to be treated.

The positions of voltage application to the first and the second electrodes may differ from each other with respect to the direction of the flow of the gas to be treated.

The reactor may be provided for treatment of a gas of a substance which has a low dissociation energy and can be decomposed by low-density plasma.

The reactor may be provided for treatment of $NO_X$.

The positions of voltage application to the first and the second electrodes may be identical to each other with respect to the direction of the flow of the gas to be treated; face opposite each other; and are offset upstream from a central position with respect to the direction of the flow of the gas to be treated.

The reactor may be provided for treatment of a gas of a substance which has a high dissociation energy and can be decomposed by high-density plasma.

The reactor may be provided for treatment of $CO_2$ fed to the reactor.

A plurality of projections may be formed on one or both surfaces of the dielectric body.

A plurality of units may be stacked, the units being formed from the first and the second electrodes and the dielectric body inserted between the electrodes.

The units may adjacent to each other share at least one electrode.

The projections formed on the surface of the dielectric body may have a cross-sectional shape selected from the group of a rhombus, a polygon, a circle, and an ellipse.

The projections formed on the surface of the dielectric body may be of different heights.

The dielectric body may be not in contact with at least one of the first and the second electrodes.

The dielectric body may be in contact with the first and the second electrodes.

Metallic microparticles may be dispersively deposited on the surface of the first electrode, to thereby induce complex barrier discharge through the application of high voltage.

The dielectric body may be stacked on the surface of the second electrode.

The metallic microparticles may have a high thermoelectron-emission property.

The metallic microparticles may be formed of at least one metal selected from the group consisting of tungsten, platinum, thallium, niobium, nickel, zirconium, cesium, and barium.

The metallic microparticles may have a high secondary-electron-emission property.

The metallic microparticles may provide a small glow-cathode-fall-voltage and have a high secondary-electron-emission property.

The metallic microparticles may be formed of at least one species selected from a group consisting of magnesium oxide, cesium-containing material, copper-beryllium, silver-magnesium, rubidium-containing material, and calcium oxide.

The metallic microparticles may be dispersed in a uniform manner or a localized manner.

The surface coverage by the dispersively deposited metallic microparticles may be 20–60%.

In another aspect of the present invention, there is provided a method for modifying gas by plasma, characterized by comprising feeding the gas to be treated into a space between the first and the second electrodes, and applying complex plasma discharge to the gas, to thereby cause gas modification reaction, the plasma being provided by a plasma reactor comprising a first planar electrode and a second planar electrode, the two electrodes facing opposite each other approximately in parallel; a dielectric body inserted between the first and the second electrodes; and a complex barrier discharge-generating means for providing a predetermined electric potential difference between the first and the second electrodes.

The ratio of the width (W) to the length (L) of the first and second electrodes may be predetermined in accordance with modification reaction of the gas to be treated, the width (W) being approximately perpendicular to the direction for feeding the gas to be treated and the length (L) being along the direction.

The relationship between W and L may be adjusted to $W \geqq L$ when the modification reaction is a single-step reaction, or the relationship between W and L may be adjusted to $W \leqq L$ when the modification reaction includes multiple reaction steps.

High voltage may be applied, and the positions of voltage application to the first and the second electrodes are offset from a central position with respect to the direction of the flow of the gas to be treated.

High voltage may be applied, and the positions of voltage application to the first and the second electrodes differ from each other with respect to the direction of the flow of the gas to be treated.

High voltage may be applied, and the positions of voltage application to the first and the second electrodes are identical to each other with respect to the direction of the flow of the gas to be treated; face opposite each other; and are offset upstream from a central position with respect to the direction of the flow of the gas to be treated.

Metallic microparticles may be caused to be dispersively deposited on the surface of at least one of the first and second electrodes, to thereby induce complex barrier discharge through the application of high voltage.

In order to induce complex plasma discharge, there must be appropriately set conditions such as dielectric constant of the dielectric body inserted between the electrodes, the mode for placing the dielectric body, the shape of the dielectric body, the distance between the electrodes, and voltage to be applied to the electrodes.

Particularly, complex barrier discharge can be obtained at high efficiency by employing the aforementioned preferred modes of the plasma reactor.

The type of complex barrier discharge to be induced is preferably modified in accordance with conditions such as the species of the gas to be treated and the type of reaction for gas modification.

For example, as described above, the probability of contact between plasma and modified gas molecules can be controlled by modifying the dimensions of the gas passage between the electrodes for generating plasma in accordance with the gas to be treated. Specifically, the ratio of the width to the length (W/L) is predetermined in accordance with the type of gas modification reaction. Thus, the cumulative excited state of reaction gas molecules can be controlled, to thereby enhance selectivity of modification products and modification efficiency.

In addition, by offsetting the positions of high-voltage application to the electrodes from a central position with respect to the gas flow direction, the electric field profile between the electrodes is modified, thereby attaining high-efficiency and high-selectivity gas modification.

Thus, an object of the present invention is to provide a plasma reactor attaining remarkably enhanced gas modification efficiency. Another object of the invention is to provide a method for modifying gas attaining remarkably enhanced gas modification efficiency.

In the present invention, the plasma reactor and the gas modification method are adjusted in accordance with reaction steps of the gas to be treated.

In addition, the plasma reactor and the gas modification method attain high-efficiency and high-selectivity gas modification by controlling the electric field profile between the electrodes. dr

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with accompanying drawings, in which.

DETAILED DESCRIPTION OF PREFERRED EMBODIMENTS

Embodiments according to the present invention will next be described. However, the embodiments should not be construed as limiting the invention thereto.

Embodiment 1

Figure 1:
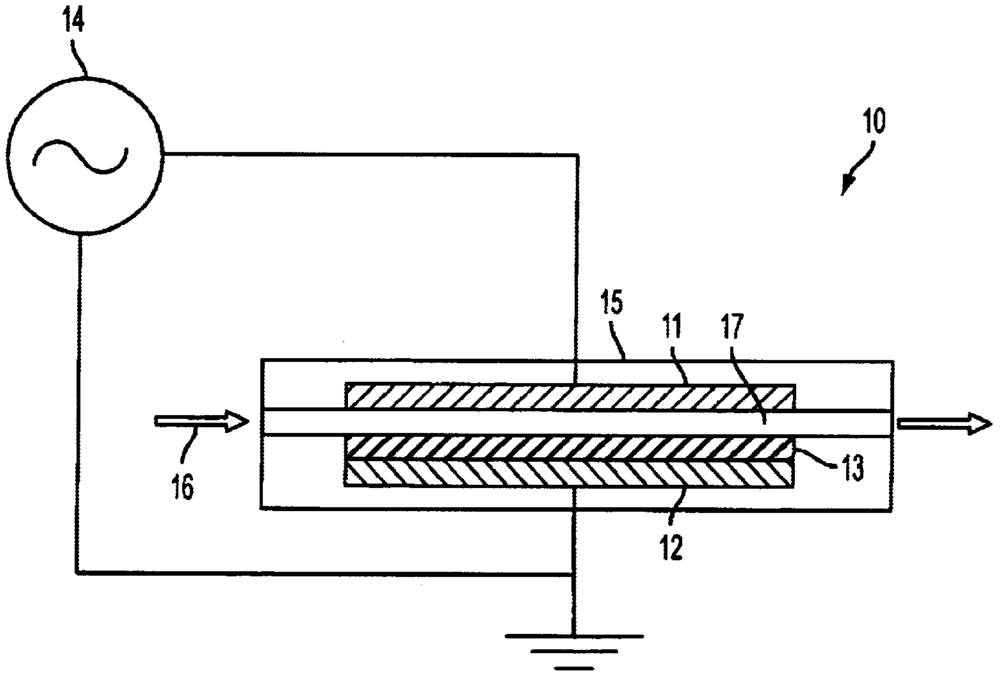
FIG. 1 is a schematic view of a plasma reactor employed in Embodiment 1 of the present invention.

FIG. 1 shows a schematic view of a plasma reactor according to Embodiment 1 of the present invention.

As shown in FIG. 1, a plasma reactor 10 according to Embodiment 1 comprises a first planar metallic electrode 11 and a second planar metallic electrode 12, the two electrodes facing opposite each other in parallel; a dielectric body 13 applied to the second metallic electrode 12; and a power supply unit 14 for applying AC voltage to the first metallic electrode 11 and the second metallic electrode 12 so as to induce discharge. The first and second metallic electrodes 11 and 12 and the dielectric body 13 are placed in a ceramic container 15. By causing a gas to be treated 16 to flow through a passage provided in the ceramic container 15, the gas to be treated 16 is introduced into a discharge space 17 provided between the first electrode 11 and the dielectric body 13.

The properties of the dielectric body 13, such as specific dielectric constant, are set such that complex barrier discharge is induced in a space between the first electrode 11 and the dielectric body 13 when a predetermined voltage is applied between the first metallic electrode 11 and the second metallic electrode 12.

In the plasma reactor 10, modification efficiency of the gas to be treated 16 can be enhanced by controlling the ratio of the electrode width (W); i.e., the width of the first metallic electrode 11, the second metallic electrode 12, and the dielectric body 13, to the electrode length (L) in a direction of feeding the gas to be treated 16 such that the ratio falls within a specific range.

Case 1. Modification of gas by employing a single-step reaction (e.g., decomposition of $CO_2$)

Reaction example: $CO_2 \rightarrow CO+O$

By adjusting the relationship between the electrode width W and the electrode length L to W≧L; i.e., W/L≧1, gas modification efficiency is enhanced.

When the electrode length increases to a sufficient degree, CO or O contained in a modified gas is excited again through contact with plasma, to thereby promote recombination to form $CO_2$. Thus, when the relationship is adjusted to W/L<1, gas modification efficiency decreases as the electrode length L increases.

Case 2. Modification of gas by employing a multiple-step reaction (e.g., $H_2$ formation from $CH_4$)

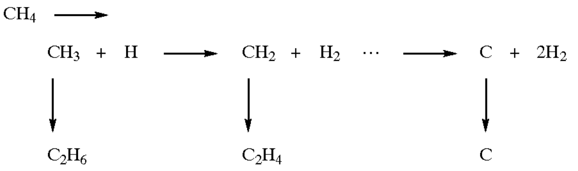

By adjusting the relationship between the electrode width W and the electrode length L to W≦L; i.e., W/L≦1, the gas to be treated undergoes successive reactions during passage through a plasma field, thereby enhancing modification efficiency and $H_2$ formation efficiency. In addition, by selecting the electrode length L, the end point of the reaction can be controlled and the components of the resultant gas can be determined stepwise and selectively.

Test examples showing the effects of Embodiment 1 according to the present invention will next be described.

TEST EXAMPLE 1

Modification of gas by employing a single-step reaction (e.g., decomposition of $CO_2$)

Figure 2A:
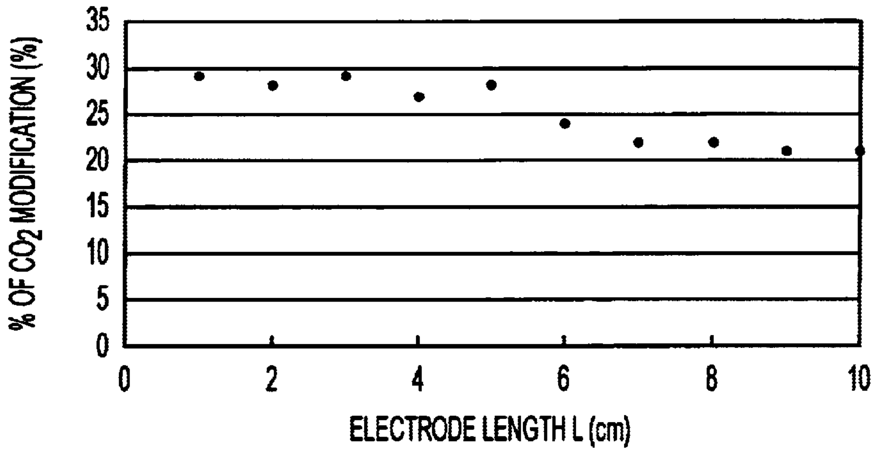
FIGS. 2A and 2B are graphs showing results of Test Example 1 of Embodiment 1 of the present invention.

First, the modification percentage of $CO_2$ gas was measured under a variety of electrode lengths L when the electrode width W was set at 5 cm. The results are shown in FIG. 2A.

The results indicate that the $CO_2$ modification efficiency was almost constant until the electrode length L reached 5 cm, and that thereafter the $CO_2$ modification efficiency decreased as the electrode length L increased.

The supposed reason why the $CO_2$ modification efficiency decreases as the electrode length L increases is that CO or $O_2$ formed through decomposition by discharge is re-excited during further passage through the plasma field, thereby causing recombination to form $CO_2$.

Figure 2B:
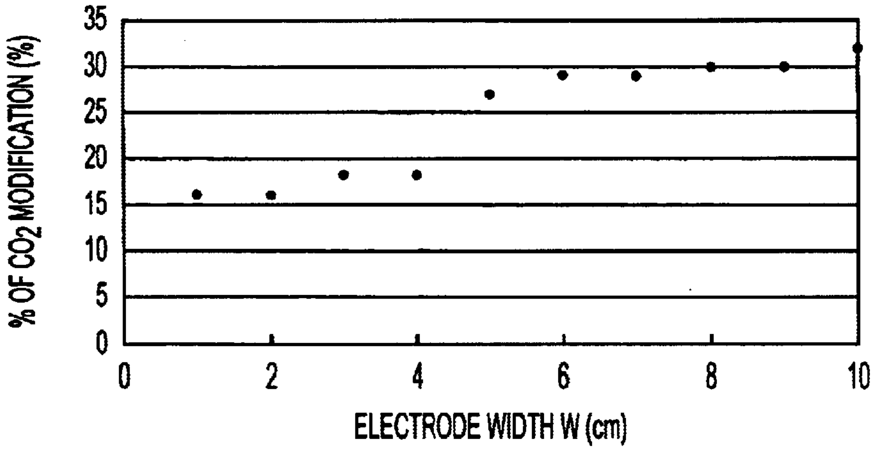

Secondly, the modification percentage of $CO_2$ gas was measured under a variety of electrode widths W when the electrode length L was set at 5 cm. The results are shown in FIG. 2B.

The results indicate that the $CO_2$ modification efficiency was increased as the electrode width W increased and that the $CO_2$ modification efficiency increased remarkably when the electrode width W was 5 cm or longer.

Accordingly, the dimensional relationship has been found to be adjusted preferably to W≧L, when the modification reaction is a single-step reaction (e.g., modification of $CO_2$).

TEST EXAMPLE 2

Modification of gas by employing a multiple-step reaction (e.g., $H_2$ formation from $CH_4$)

Figure 3A:
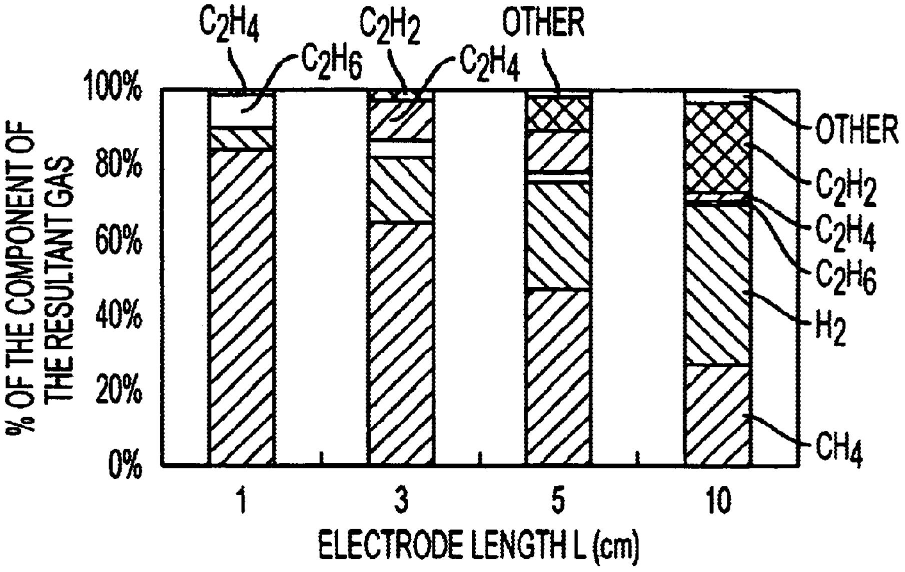
FIGS. 3A and 3B are graphs showing results of Test Example 2 of Embodiment 1 of the present invention.

First, the composition of the plasma-treated $CH_4$ gas was quantitatively determined under a variety of electrode lengths L when the electrode width W was set at 5 cm. The results are shown in FIG. 3A.

The results indicate that the modification reaction successively proceeded more effectively as L was increased when the electrode width W was kept at 5 cm and that the yield of $H_2$ produced through dehydrogenation steps was remarkably enhanced. In addition, when the electrode length L is selected, the proportions of HC by-products other than $H_2$ contained in the resultant gas can be controlled. In other words, selection of the electrode length L has been found to determine the products more selectively.

Figure 3B:
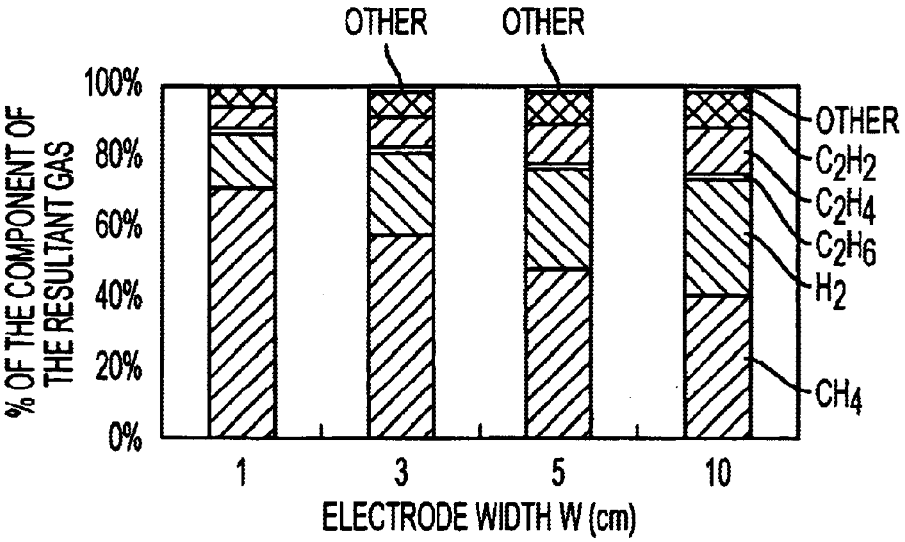

Secondly, the composition of the plasma-treated $CH_4$ gas was quantitatively determined under a variety of electrode widths W when the electrode length L was set at 5 cm. The results are shown in FIG. 3B.

The results indicate that the yield of $H_2$ increased as the electrode width W increased when the electrode length L was constant and that no charge was observed in relative proportions of HC by-products contained in the resultant gas.

Accordingly, it has been found that the dimensional relationship is adjusted preferably to $W \leqq L$, when the modification reaction is a multiple-step reaction, and control of the electrode width W and the electrode length L can selectively determine the products.

As described above, according to Embodiment 1, there can be provided a plasma reactor which attains high-efficiency and high-selectivity gas modification reaction by controlling the electrode dimensional ratio in accordance with the type and the composition of the gas to be treated and the purpose of modification.

Embodiment 2

Figure 4:
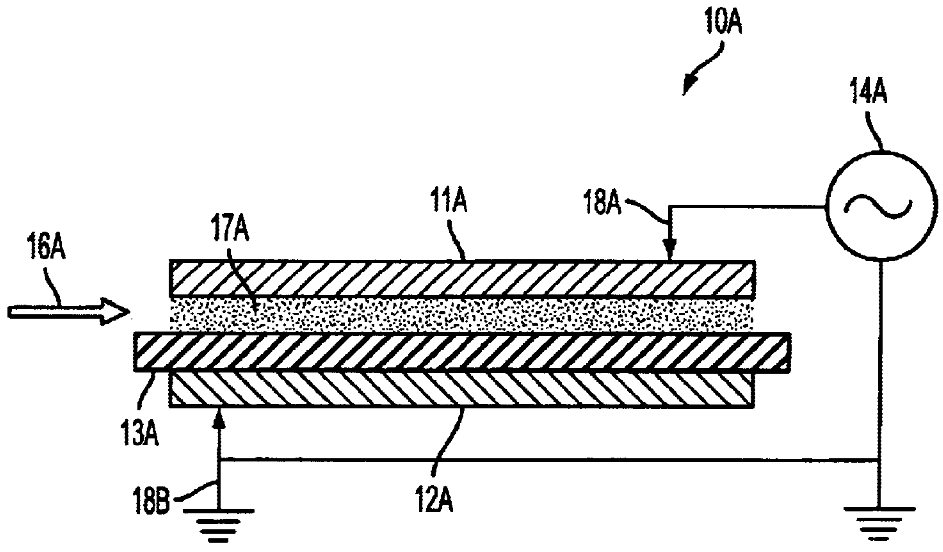
FIG. 4 is a schematic view of a plasma reactor employed in Embodiment 2 of the present invention.

FIG. 4 shows a schematic view of a plasma reactor according to Embodiment 2 of the present invention.

As shown in FIG. 4, a plasma reactor 10A according to Embodiment 2 comprises a first planar metallic electrode 11A and a second planar metallic electrode 12A, the two electrodes facing opposite each other in parallel; a dielectric body 13A applied to the second metallic electrode 12A; and a power supply unit 14A for applying AC voltage between the first metallic electrode 11A and the second metallic electrode 12A so as to induce plasma discharge in a discharge space 17A. In the first electrode 11A, the position of voltage application is located on the downstream side with respect to the direction of the gas flow, whereas, in the second electrode 12A coated with the dielectric body 13A, the position of voltage application is located on the upstream side with respect to the direction of the flow of the gas to be treated 16A. Specifically, the positions of high-voltage application 18A and 18B—from the power supply unit 14A to the first and second electrode 11A and 12A—differ from each other.

Figure 5:
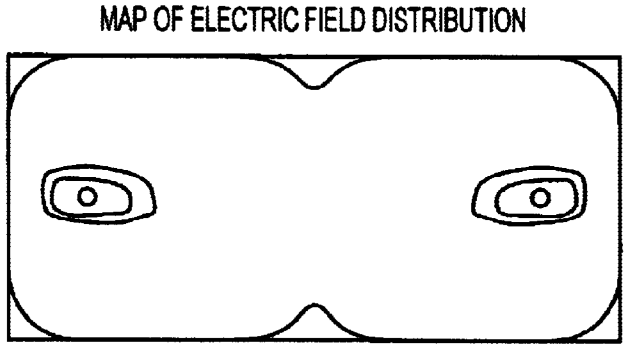
FIG. 5 is a map showing electric field distribution of the apparatus shown in FIG. 4.

In other words, voltage is applied to different positions such that the electric field profile as shown in FIG. 5—a profile in a dimensional plane parallel to the electrode plane—is provided. Thus, an electric field of uniform intensity is provided, thereby uniformly generating plasma of comparatively low density.

Accordingly, when a gas such as $NO_X$ having a comparatively low dissociation energy and undergoing decomposition by low-density plasma is decomposed by employing the reactor, excellent decomposition efficiency is attained.

Embodiment 3

Figure 6:
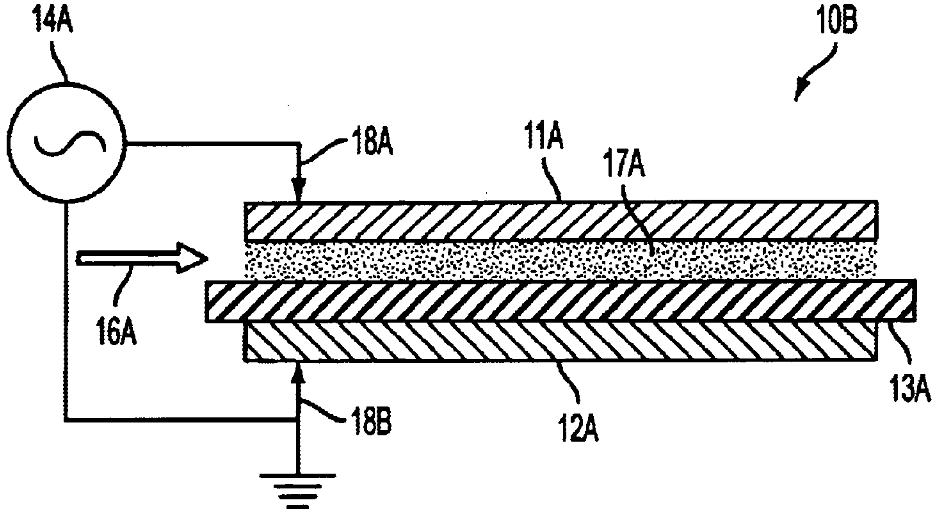
FIG. 6 is a schematic view of a plasma reactor employed in Embodiment 3 of the present invention.

FIG. 6 shows a schematic view of a plasma reactor according to Embodiment 3 of the present invention.

As shown in FIG. 6, a plasma reactor 10B according to Embodiment 3 comprises a first planar metallic electrode 11A and a second planar metallic electrode 12A, the two electrodes facing opposite each other in parallel; a dielectric body 13A applied to the second metallic electrode 12A; and a power supply unit 14A for applying AC voltage between the first metallic electrode 11A and the second metallic electrode 12A so as to induce plasma discharge in a discharge space 17A. The positions of voltage application 18A and 18B—from the power supply unit 14A to the first and second electrode 11A and 12A—are provided such that two positions face opposite each other and are offset on the upstream side with respect to the direction of the flow of the gas to be treated 16A.

Figure 7:
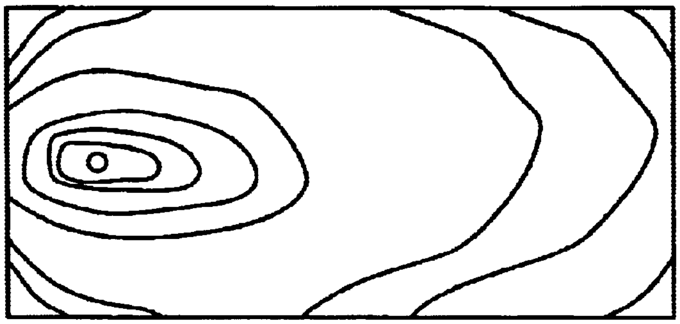
FIG. 7 is a map showing electric field distribution of the apparatus shown in FIG. 6.

In Embodiment 3, voltage is applied such that the electric field profile as shown in FIG. 7—a profile in a dimensional plane parallel to the electrode plane—is provided. As shown in the profile, the region nearer the point to which voltage had been applied exhibited high electric field intensity and the region farther from the point exhibited low electric field intensity. Thus, high-density plasma is induced predominantly on the upstream side of the gas flow.

Accordingly, when a gas such as $CO_2$ having a high dissociation energy and undergoing decomposition reaction only in the presence of a high-density plasma portion is treated in such a reactor, excellent decomposition efficiency is attained.

In addition, in Embodiment 3, it is preferable that the positions of voltage application to the electrodes are offset from a central position (X) on the upstream side with respect to the direction of the gas flow. By employing such a positioning, several reactions requiring different reaction energies can be effected in one reactor.

Specifically, when the voltage application positions are offset on the upstream side with respect to the direction of the gas flow, a gas requiring a high reaction energy undergoes reaction on the upstream side, and a gas requiring only a low reaction energy undergoes reaction on the downstream side.

When the voltage application positions are offset on the upstream side with respect to the direction of the gas flow, $CO_2$ contained in a $CO_2$—$O_2$—$N_2$ mixture undergoes decomposition, but $NO_X$ is simultaneously formed on the upstream side. However, since the $NO_X$ formed decomposes on the downstream side, the overall reaction produces no harmful $NO_X$ and exclusively decomposes $CO_2$.

Thus, by appropriately controlling the voltage application positions in accordance with the type and the composition of the gas to be treated and the purpose of the reaction, high-efficiency and high-selectivity gas modification reaction can be attained.

Accordingly, even through the gas to be treated is a mixture, the gas can be decomposed by employing a plasma reactor as shown in FIG. 6 and appropriately modifying the voltage application positions.

Specific Test Examples of Embodiment 3 will next be described, which should not be construed as limiting the invention thereto.

TEST EXAMPLE 3

Figure 8:
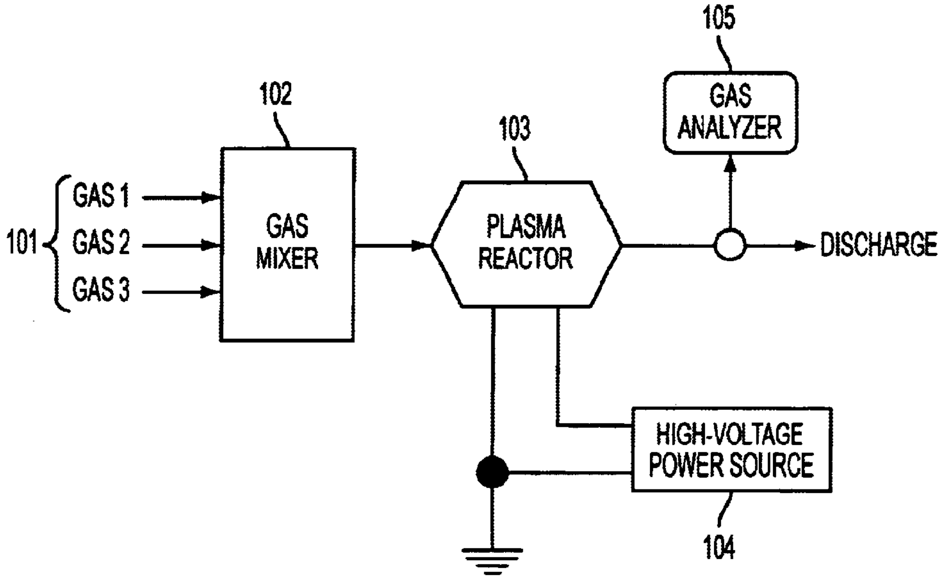
FIG. 8 is a schematic view of a test apparatus employed in Test Examples.

By employing an apparatus as shown in FIG. 8, gas decomposition efficiency was measured while the voltage application positions were modified.

As shown in FIG. 8, the apparatus comprises a gas mixer 102 for mixing a plurality of gases (gas 1, gas 2, and gas 3) 101; a plasma reactor 103 for effecting plasma-decomposition of the fed gas mixture; a high-voltage power source 104 for applying high voltage to the plasma reactor; and a gas analyzer 105 for analyzing the decomposed gas.

Decomposition of $NO_X$ was tested while the voltage application positions were modified as the following conditions (1) to (5).

Figure 9A:
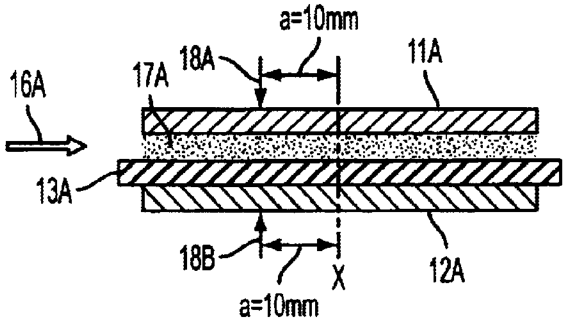
FIGS. 9A to 9D are schematic views of a test apparatus having different voltage application positions.

(1) As shown in FIG. 9A, the voltage application positions 18A and 18B to the electrodes 11A and 12A faced opposite each other and were offset by 10 mm (a=10 mm) from a central position (X) on the upstream side with respect to the direction of the gas flow.

Figure 9B:
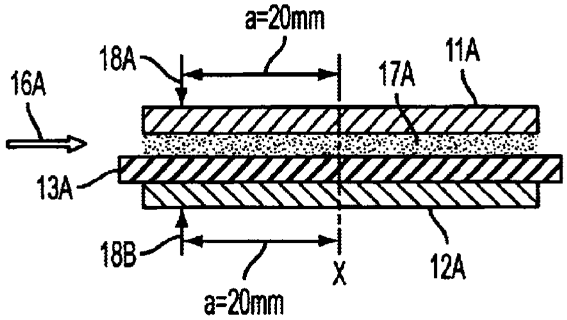

(2) As shown in FIG. 9B, the voltage application positions 18A and 18B with respect to the electrodes 11A and 12A faced opposite each other and were offset by 20 mm (a=20 mm) from a central position (X) on the upstream side with respect to the direction of the gas flow.

Figure 9C:
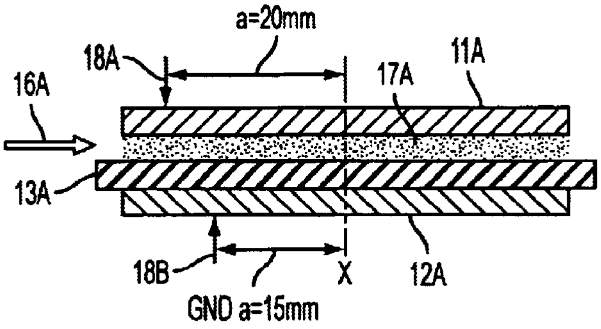

(3) As shown in FIG. 9C, the voltage application positions 18A and 18B with respect to the electrodes 11A and 12A were shifted from facing opposite positions such that the voltage application position 18A with respect to the electrode 11A (high voltage side) was offset by 20 mm (a=20 mm) and the voltage application position 18B with respect to the electrode 12A (ground side) was offset by 15 mm (a=15 mm) from a central position (X) on the upstream side with respect to the direction of the gas flow.

Figure 9D:
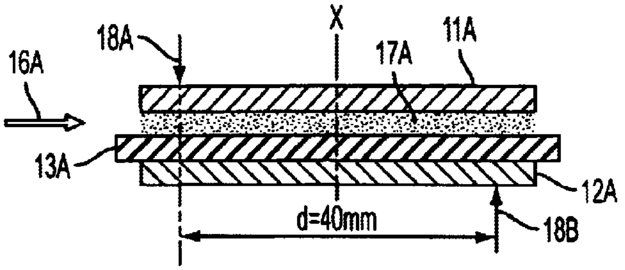

(4) As shown in FIG. 9D, the voltage application positions 18A and 18B with respect to the electrodes 11A and 12A were shifted from positions facing opposite each other such that the voltage application position 18A with respect to the electrode 11A (high voltage side) and the voltage application position 18B with respect to the electrode 12A (ground side) were offset (symmetrically with respect to a central position X) so as to provide the voltage application position interval of 40 mm (d=40 mm).

(5) For comparison, the voltage application positions 18A and 18B to the electrodes 11A and 12A faced opposite each other and were set at a central position (X) (a=0 mm).

$NO_X$ gas decomposition conditions in relation to the Test Example will be described hereunder.

Gas composition: NO (500 ppm)+$O_2$ (10%)/$N_2$ (balance)
Gas flow: 200 cc/minute
Target reaction: decomposition of NO (NO→$N_2$+$O_2$)
Power voltage: 2.8 kV (peak)
Power frequency: 10 kHz
Dielectric material: $Al_2O_3$ (attached to ground electrode)
Thickness of dielectric body: 0.5 mm
Electrode material: SUS
Dimensions of electrode: 50 mm×20 mm (gas flow direction, longitudinal)
Discharge path: 0.5 mm Test results of gas decomposition under the aforementioned voltage application conditions are shown in TABLE 1 and FIG. 10.

TABLE 1

| | Electric connection method | Outlet $NO_x$ concentration | Decomposition percentage (%) |
|---|---|---|---|
| (1) | Offset (a = 10 mm) homo-position | 380 ppm | 24% |
| (2) | Offset (a = 20 mm) homo-position | 145 ppm | 71% |
| (3) | Offset (a = 20 mm, a = 15 mm) hetero-positions) | 90 ppm | 82% |
| (4) | Offset (symmetric with respect to X) | 0 ppm | 100% |
| (5) | No offset, homo-position | 710 ppm | — ($NO_x$ formed) |

Figure 10:
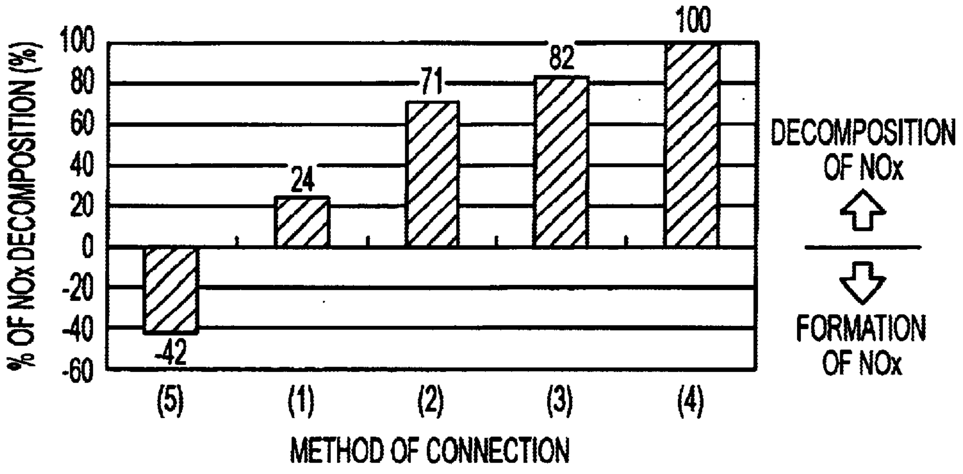
FIG. 10 is a graph showing results of Test Example 3 and the relationship between the voltage application position and the decomposition rate of $NO_X$.
Figure 11:
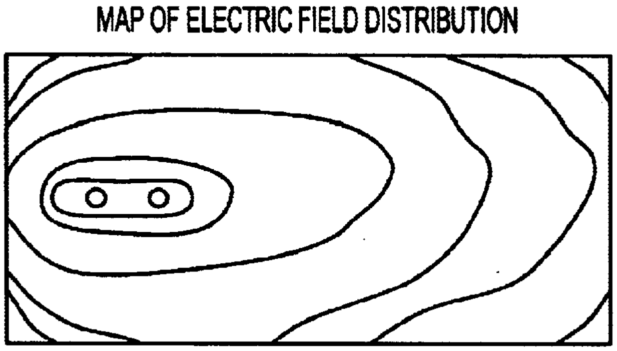
FIG. 11 is a map showing electric field distribution of the apparatus shown in FIG. 9C.

As shown in TABLE 1 and FIG. 10, under voltage application conditions of (1) (homo-position offset (a=10 mm)), the outlet concentration was 380 ppm and the decomposition percentage was 24%. Under voltage application conditions of (2) (homo-position offset (a=20 mm)), the outlet concentration was 145 ppm and the decomposition percentage was 71%. Under voltage application conditions of (3) (hetero-position offset), as shown in the electric field profile of FIG. 11, electric field intensity decreased as compared with the intensity provided by homo-position offset. In this case, the outlet concentration was 90 ppm and the decomposition percentage was 82%. Under voltage application conditions of (4) (offset, symmetric with respect to X), the outlet concentration was 0 ppm and the decomposition percentage was 100%. Under voltage application conditions of (5) (at (X) (a=0 mm), homo-position), the outlet concentration was 710 ppm, and no gas decomposition occurred, but $NO_X$ was formed.

TEST EXAMPLE 4

In Test Example 4, the decomposition test was performed in terms of $CO_2$ instead of $NO_X$.

The voltage application positions during decomposition of $CO_2$ were modified as shown in FIGS. 9B to 9D (conditions (2) to (5)).

$CO_2$ gas decomposition conditions will be described hereunder.

Gas composition: $CO_2$(10%)+$O_2$ (10%)/$N_2$ (balance)
Gas flow: 200 cc/minute
Target reaction: decomposition of $CO_2$ ($CO_2$→CO+½$O_2$)
Power voltage: 2.5 kV (peak)
Power frequency: 10 kHz
Dielectric material: $Zr_2O_3$ (attached to ground electrode)
Thickness of dielectric body: 0.5 mm
Electrode material: SUS
Dimensions of electrode: 50 mm×20 mm (gas flow direction, longitudinal)
Discharge path: 0.5 mm Test results of gas decomposition under the aforementioned voltage application conditions are shown in TABLE 2 and FIG. 12.

TABLE 2

| | Electric connection method | Decomposition of $CO_2$ (%) | Outlet $NO_x$ concentration |
|---|---|---|---|
| (2) | Offset (a = 20 mm) homo-position | 35.3% | 0 |
| (3) | Offset (on upstream side) | 26.5% | 0 |
| (4) | Offset (symmetric with respect to X) | 3.2% | 0 |
| (5) | No offset, homo-position | 39.7% | 220 ppm |

Figure 12:
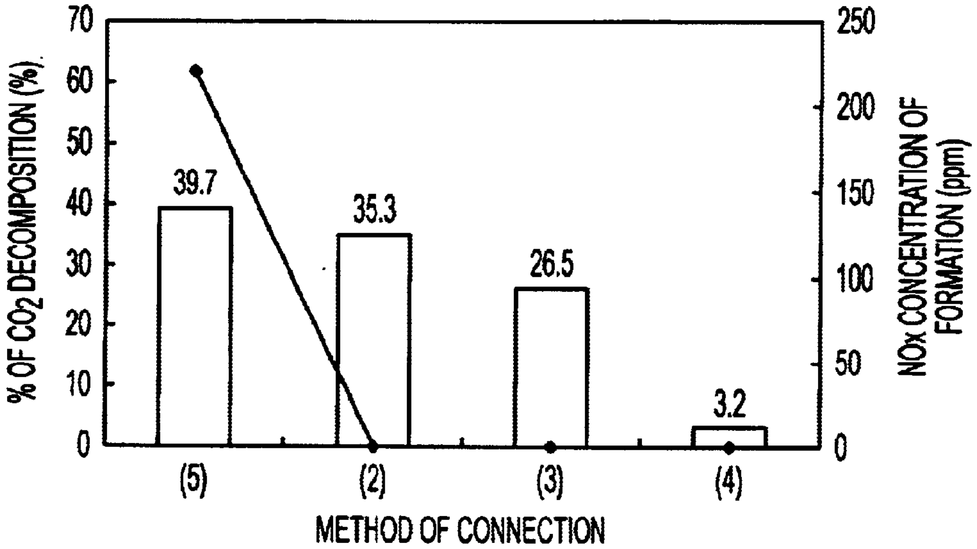
FIG. 12 is a graph showing results of Test Example 4 and the relationship between the voltage application position and the decomposition rate of $CO_2$.

As shown in TABLE 2 and FIG. 12, under voltage application conditions of (2) (homo-position offset (a=20 mm)), the decomposition percentage of $CO_2$ was 35.3% and the outlet $NO_X$ concentration was 0 ppm. Under voltage application conditions of (3) (offset on the upstream side), as shown in the electric field profile of FIG. 11, electric field intensity decreased as compared with the intensity provided by homo-position offset. In this case, the decomposition percentage of $CO_2$ was 26.5% and the outlet $NO_X$ concentration was 0 ppm. Under voltage application conditions of (4) (offset, symmetric with respect to X), the decomposition percentage of $CO_2$ was 3.2% and the outlet $NO_X$ concentration was 0 ppm. In the above cases, the decomposition percentage of $NO_X$ reached 100%. Under voltage application conditions of (5) (at (X) (a=0 mm), homo-position), the decomposition percentage of $CO_2$ was 39.7% and the outlet $NO_X$ concentration was 220 ppm.

As described above, under the conditions of (2) (homo-position offset), $NO_X$ was formed on the upstream side. However, the formed $NO_X$ was decomposed on the downstream side where low-intensity electric field was applied. Thus, the overall reaction can be regarded substantially as decomposition of $CO_2$, and the target reaction can be attained with high efficiency and high selectivity.

In contrast, under the conditions of (4) (offset, symmetric with respect to X), no high-electric-field portion was provided. Thus, no substantial $CO_2$ decomposition—the target reaction—could be attained.

In addition, under voltage application conditions of (5) (at (X) (a=0 mm), homo-position), decomposition of the formed $NO_X$ was incomplete. Thus, a portion of $NO_X$ remained.

As described above, according to Embodiments 2 and 3, in which the high-voltage application positions are shifted from a central position (X), the electric field profile can be modified, to thereby attain high-efficiency and high-selectivity gas modification.

Embodiment 4

Figure 13:
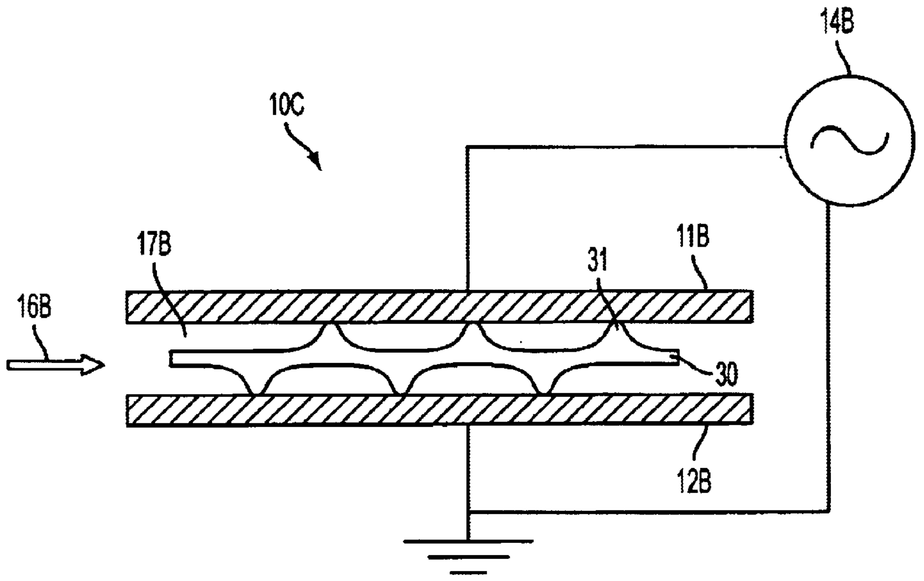
FIG. 13 is a schematic view of a plasma reactor employed in Embodiment 4 of the present invention.
Figure 14A:
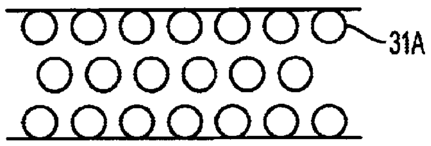
FIGS. 14A to 14C are schematic views of patterns of projections.
Figure 14B:
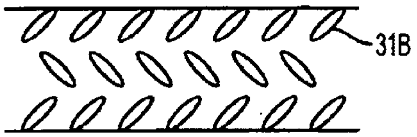
Figure 14C:
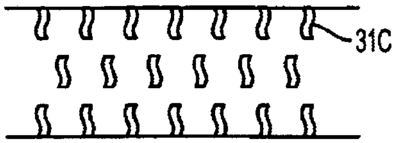

FIG. 13 shows a schematic representation of a plasma reactor according to Embodiment 4 of the present invention. FIGS. 14A to 14C show schematic representations of different configurations of projections.

As shown in FIG. 13, a plasma reactor 10C according to Embodiment 4 comprises a first planar metallic electrode 11B, a second planar metallic electrode 12B, a dielectric body 30, and a power supply unit 14B, with the first and second electrodes 11B and 12B face opposite each other. The dielectric body 30 is interposed between the first electrode 11B and the second electrode 12B, and is provided with projections 31 on the surface thereof. The power supply unit 14B is connected to the first and second electrodes 11B and 12B, to thereby produce a potential difference therebetween. According to Embodiment 4, the projections 31 are in contact with the first electrode 11B and with the second electrode 12B.

AC voltage is applied from the power supply unit 14B to a discharge space 17B formed between the first electrode 11B and the second electrode 12B on which projections 31 are provided, thereby inducing complex plasma discharge in the discharge space 17B in the aforementioned manner. A gas 16B introduced into the discharge space 17B undergoes plasma treatment and gas modification, and the resultant modified gas is discharged from the discharge space 17B.

Since the reactor is provided with projections, the introduced gas hits the projections 31, to thereby decelerate the gas flow, and attain a uniform gas flow rate. Therefore, the overall residence time in the discharge space 17B is prolonged as compared with the case in which a discharge space is defined by flat surfaces, resulting in improved plasma treatment efficiency. Moreover, electric field intensity around the projections 31 is enhanced. A higher electric field facilitates formation of a complex barrier discharge in which a plurality of discharge pillars similar to localized concentrated discharge of high quantity of light are readily induced in a barrier discharge, to thereby promote reaction.

When the projections 31 are not required to be formed on both sides of the dielectric body 30, the projections 31 may be provided on one side of the dielectric body 30.

The shape of the projections 31 is not particularly limited. However, a shape which can enhance the collision frequency of a gas against the projections 31 may be employed. Examples of the projections 31 include projections 31A having circular cross sections as shown in FIG. 14A; projections having star-shaped cross sections; projections having triangular cross sections; projections 31B having ellipsoidal cross sections, each of the projections 31B being arranged obliquely with respect to the gas flow direction as shown in FIG. 14B; and projections 31C having S-shaped cross sections as shown in FIG. 14C. Alternatively, projections having any cross sections, such as rhombic cross sections, polygonal cross sections, and ellipsoidal cross sections, may be employed in accordance with needs.

Embodiment 5

Figure 15:
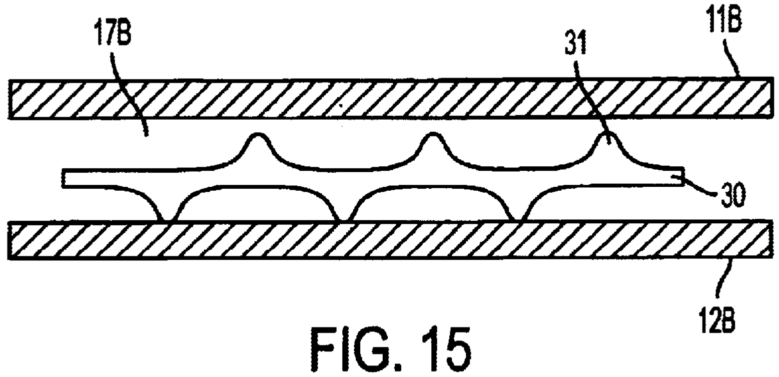
FIG. 15 is a schematic view of a plasma reactor employed in Embodiment 5 of the present invention.

As shown in FIG. 15, the plasma according to the Embodiment 5 is similar to that according to Embodiment 4, except that the projections 31 formed on the dielectric body are in contact with one side (lower side in FIG. 15) of the second electrode 12B. Thus, repeated descriptions of the other members denoted by the same reference numerals as in the first embodiment are omitted.

According to Embodiment 5, the collision frequency of the introduced gas molecules against the projections is enhanced, resulting in improved reaction efficiency.

Embodiment 6

Figure 16:
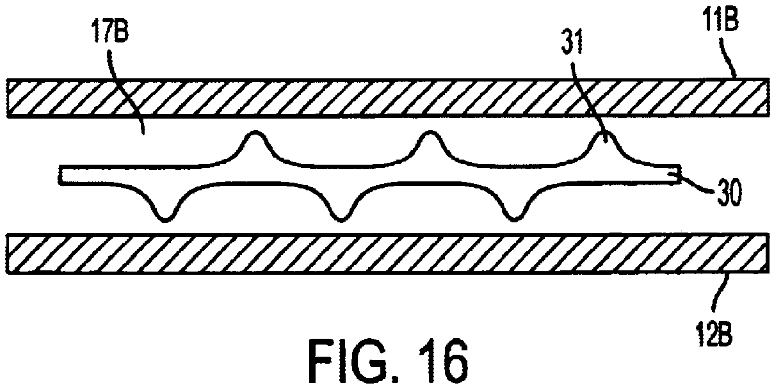
FIG. 16 is a schematic view of a plasma reactor employed in Embodiment 6 of the present invention.

FIG. 16 shows a schematic representation of a plasma reactor according to Embodiment 6 of the present invention.

As shown in FIG. 16, the plasma according to Embodiment 6 is similar to that according to Embodiment 1, except that projections 31 formed on the dielectric body are maintained away from inner surfaces of the electrodes facing opposite each other. Thus, repeated descriptions of the other members denoted by the same reference numerals as in the first embodiment are omitted.

Similarly, according to Embodiment 6, the collision frequency of the introduced gas molecules against the projections is enhanced, resulting in improved reaction efficiency.

Embodiment 7

Figure 17:
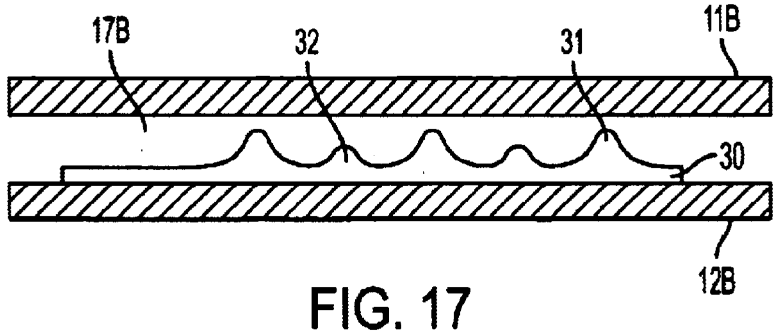
FIG. 17 is a schematic view of a plasma reactor employed in Embodiment 7 of the present invention.

FIG. 17 shows a schematic representation of the main portions of a plasma reactor according to Embodiment 7 of the present invention.

As shown in FIG. 17, the plasma reactor according to Embodiment 7 is provided with projections 31 and projections 32 of lower heights than the projections 31. Such projections yield a non-uniform—locally higher—electric field between the projections and a first planar metallic electrode 11B. The locally higher electric field induces localized discharge. As a result, a complex barrier discharge in which the localized discharge is included in a silent discharge is efficiently produced.

As described above, according to Embodiment 7, installation of the projections 32 of lower height in addition to the projections 31 yields a complex barrier discharge in which a mist-like barrier discharge is included with lightning-like localized concentrated discharge. Therefore, the energy level of the plasma is improved, and the collision frequency of the introduced gas molecules generated through gas decomposition is improved, to thereby improve the gas modification efficiency.

Specific Test Examples carried out in the present invention will next be described, which should not be construed as limiting the invention thereto.

TEST EXAMPLE 5

The apparatus shown in FIG. 8 was used. Variation of gas decomposition efficiency depending on the shape of the projections was examined.

Figure 18A:
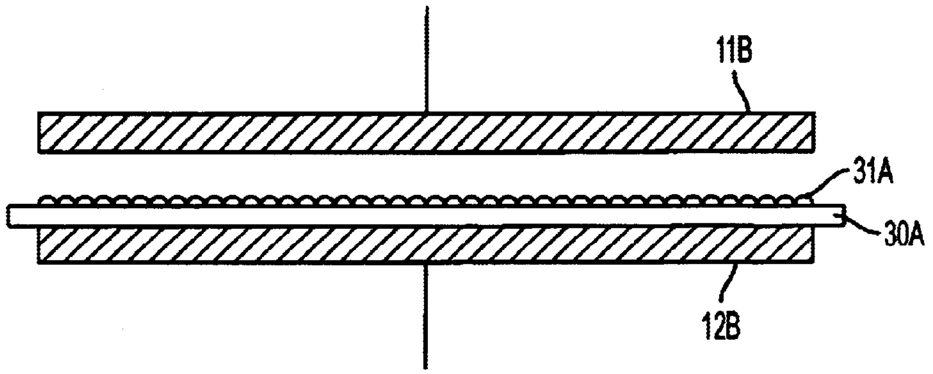
FIGS. 18A to 18C are schematic views of patterns of projections employed in Test Examples.
Figure 18B:
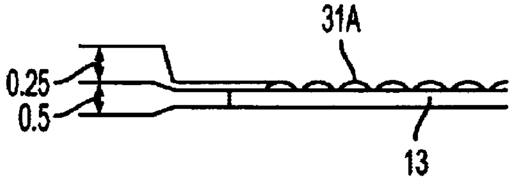
Figure 18C:
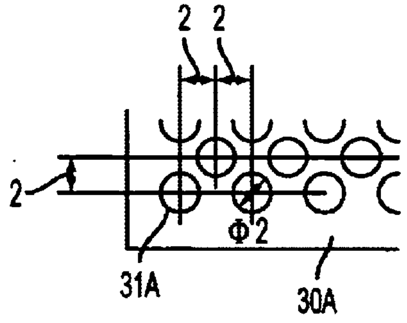
Figure 19A:
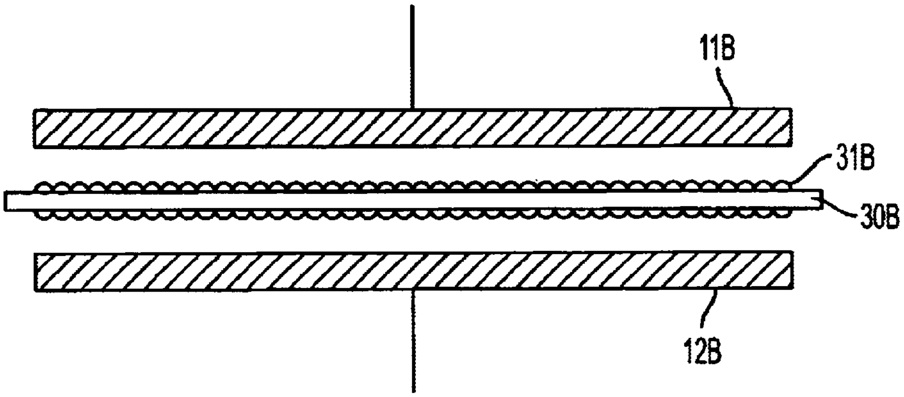
FIGS. 19A to 19C are schematic views of patterns of projections employed in Test Examples.
Figure 19B:
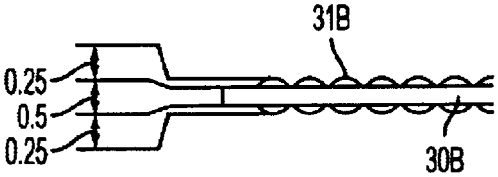
Figure 19C:
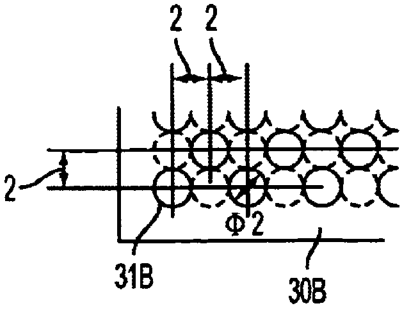
Figure 20A:
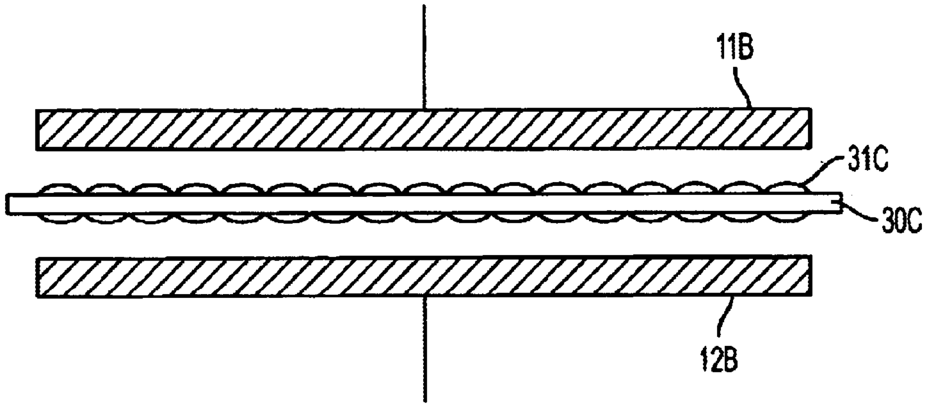
FIGS. 20A to 20C are schematic views of patterns of projections employed in Test Examples.
Figure 20B:
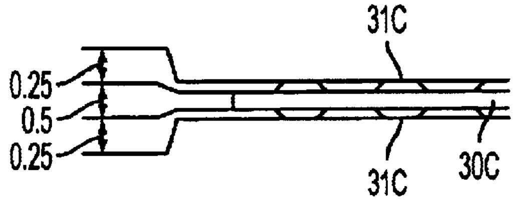
Figure 20C:
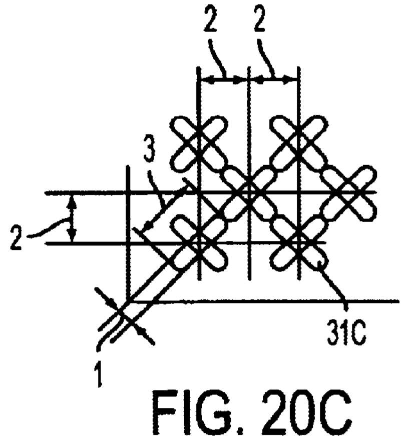

The shape and the configuration of the projections 31 formed on the dielectric body were varied as shown in FIGS. 18 to 20, and $CO_2$ decomposition tests were performed through each of the dielectric bodies. The results are shown in TABLE 3 and FIG. 21.

$CO_2$ gas decomposition conditions employed for Test Example 5 are as follows:

Gas composition: $CO_2$ (10%)+$O_2$ (10%)/$N_2$ (balance)

Gas flow: 200–1000 cc/minute

Target reaction: $CO_2$ decomposition ($CO_2 \rightarrow CO + \frac{1}{2}O_2$)

Type of reactor

Electrode dimensions: 20 mm×50 mm

Material for dielectric body: $Al_2O_3$

Reactor volume: 286 cc (1) Dielectric body with projections (each of the projections had a circular cross section and the projections were formed on one side of the dielectric body; only one side of the dielectric body was in contact with an electrode (see FIGS. 18A to 18C):

Thickness of dielectric body 30A: 0.5 mm

Height of projection 31A: 0.25 mm

Diameter of projection 31A: 2 mm (2) Dielectric body with projections (each of the projections had a circular cross section and the projections were formed on both sides of the dielectric body; the dielectric body was not in contact with both electrodes (see FIGS. 19A to 19C):

Thickness of dielectric body 30B: 0.5 mm

Height of projection 31B: 0.25 mm

Diameter of projection 31B: 2 mm (3) Dielectric with projections (each of the projections had an ellipsoidal cross section and the projections were formed on one side of the dielectric body; the dielectric body was not in contact with both electrodes (see FIGS. 20A to 20C):

Thickness of dielectric body 30C: 0.5 mm

Height of projection 31C: 0.25 mm

Diameter of projection 31C: 2 mm (minor diameter), 3 mm (major diameter)

(4) Dielectric body having a flat surface Thickness of dielectric body: 0.5 mm

TABLE 3

| | Gas flow (ml/min) | | | | |
|---|---|---|---|---|---|
| | 200 | 400 | 600 | 800 | 1000 |
| (4) conventional | 8 | 4.1 | 1.7 | 0.8 | 0.6 |
| (1) | 24.3 | 18.2 | 13.6 | 11.9 | 10.5 |
| (2) | 29.5 | 23.1 | 18.1 | 15.3 | 12.8 |
| (3) | 35.4 | 25.9 | 20.9 | 18 | 16.4 |

Figure 21:
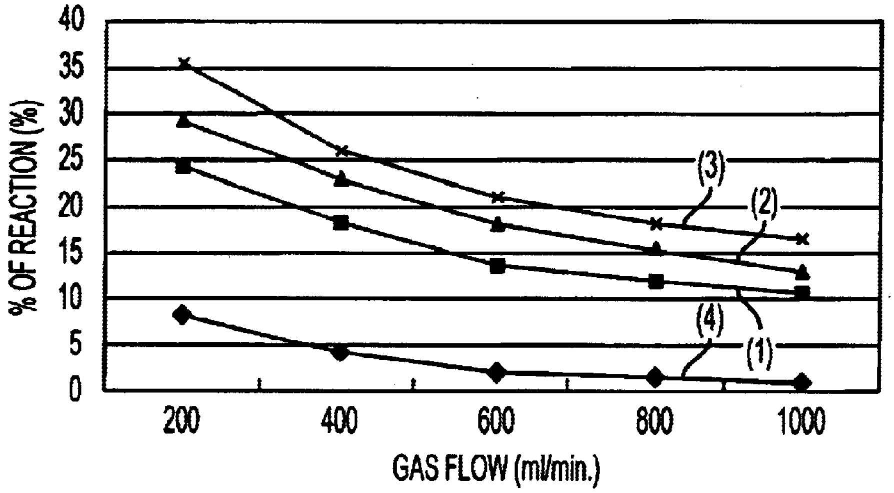
FIG. 21 is a graph showing the decomposition rates of $CO_2$ obtained in Test Examples.

As shown in TABLE 3 and FIG. 21, higher plasma gas decomposition percentages were attained by forming projections as described in (1) to (3), as compared with a conventional method as described in (4).

In addition, higher modification percentage was attained by use of each of the reactors as described in (3) and (4) according to the Embodiment 7 of the present invention, even though the discharge volume is smaller than that of the reactor as described in (2).

TEST EXAMPLE 6

$NO_x$ decomposition tests were performed using the aforementioned various plasma reactors as described in (1) to (4).

$NO_X$ gas decomposition conditions employed for Test Example 6 are as follows:

Gas composition: NO (500 ppm)+$O_2$ (10%)/$N_2$ (balance)

Gas flow: 500 cc/min

Power source: voltage (2.8 kVp), frequency (10 kHz), waveform (rectangular wave)

Material of dielectrics body: $Al_2O_3$ (mounted on the electrode connected to the ground)

Thickness of dielectric body: 0.5 mm

Electrode material: SUS

Electrode dimensions: 50 mm×20 mm (flow direction, longitudinal axis)

Discharge path: 1.5 mm

Figure 22:
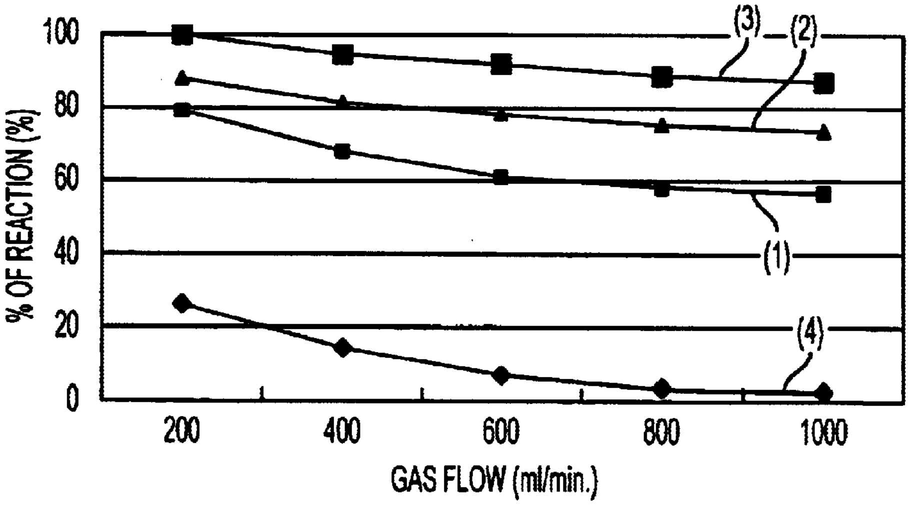
FIG. 22 is a graph showing the decomposition rates of $NO_X$ obtained in Test Examples.

The results are shown in TABLE 4 and FIG. 22.

TABLE 4

| | Gas flow (ml/min) | | | | |
|---|---|---|---|---|---|
| | 200 | 400 | 600 | 800 | 1000 |
| (4) conventional | 26 | 14 | 6 | 2 | 1 |
| (1) | 79 | 68 | 61 | 58 | 56 |
| (2) | 88 | 82 | 78 | 75 | 73 |
| (3) | 100 | 95 | 92 | 89 | 87 |

As shown in TABLE 4 and FIG. 22, higher plasma gas decomposition percentages were attained by forming projections as described in (1) to (3), as compared with a conventional method as described in (4).

In addition, higher modification percentage was attained by use of each of the reactors as described in (3) and (4) according to the present invention, even though the discharge volume is smaller than that of the reactor as described in (2).

As described above, the dielectric bodies according to Embodiments 4 to 7 are provided with projections on the surfaces thereof. Therefore, the introduced gas hits the projections, to thereby decelerate the gas flow, and attain a uniform gas flow rate. Accordingly, the overall residence time in the discharge space is prolonged as compared with the case in which a discharge space is defined by flat surfaces, resulting in improved plasma treatment efficiency and improved gas modification efficiency.

Embodiment 8

Figure 23:
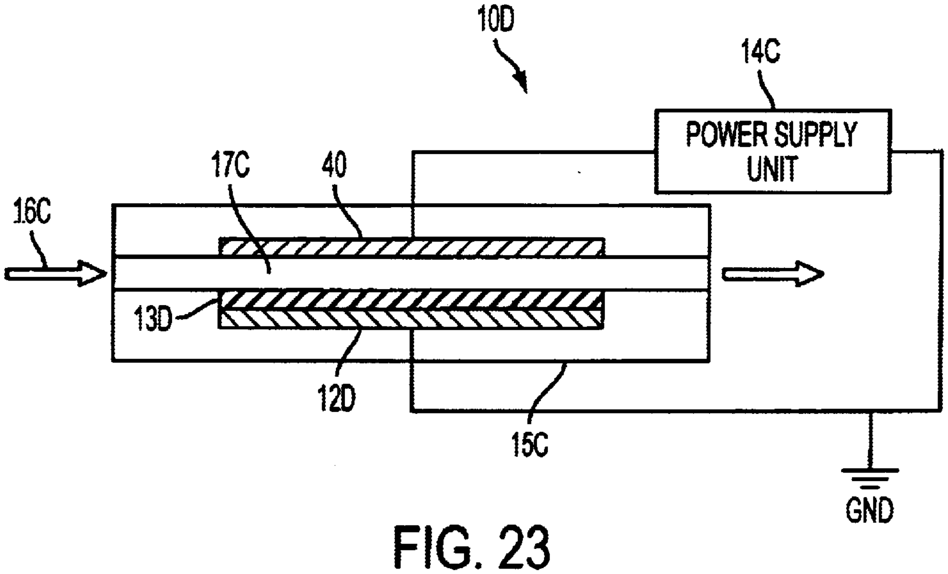
FIG. 23 is a schematic view of a plasma reactor employed in Embodiment 8 of the present invention.
Figure 24:
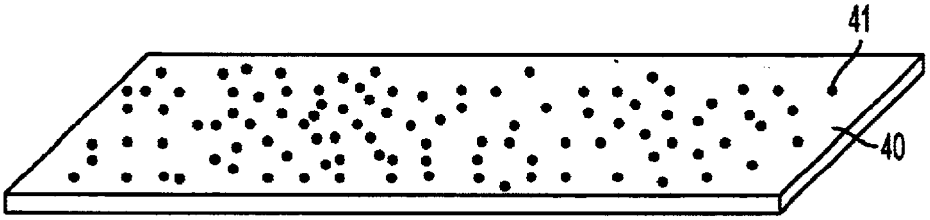
FIG. 24 is a perspective view of a metallic electrode on which metallic microparticles are dispersively deposited.

FIG. 23 shows a schematic representation of a plasma reactor according to Embodiment 8 of the present invention. FIG. 24 shows a perspective representation of a metallic electrode having metallic microparticles dispersively deposited on the surface thereof.

As shown in FIGS. 23 and 24, a plasma reactor 10D according to Embodiment 8 comprises a first planar metallic electrode 40, a second planar metallic electrode 12D, a dielectric body 13D applied to the second metallic electrode 12D, and a power supply unit 14C, with the first and second metallic electrode 40 and 12D facing opposite each other in parallel. The power supply unit 14C is connected to the first and second metallic electrode 40 and 12D, and supplies an alternative voltage therebetween, to thereby induce a discharge. The first and second electrode 40 and 12D and the dielectric body 13D are retained in a ceramic container 15C. A gas to be treated 16C is allowed to flow in a predetermined direction through a flow passage provided in the ceramic container 15C, thereby being introduced in a discharge space 17C provided between the first electrode 40 and the dielectric body 13D.

On the surface of the planar electrode 40, metallic microparticles 41 having high-thermoelectron-emission property are dispersively deposited. Examples of the metallic microparticles 41 include tungsten, platinum, thallium, niobium, nickel, zirconium, cesium, and barium.

Alternatively, such materials may be used in combination.

The particle size of the metallic microparticles 41 is not particularly limited, so long as it is 500 $\mu$m or less. However, ultra-micro-particles having a particle size of 10 $\mu$m or less are preferred.

Regarding the percent surface coverage; i.e., the percentage of the surface area of the metallic electrode 40 covered with the dispersively deposited material, a percent surface coverage of 60% or less is preferred, with 20–60% being particularly preferred in that modification efficiency is advantageously improved.

When the percent surface coverage is in excess of 60%, as shown in a further Embodiment, the discharge transforms into a single localized concentrated discharge due to considerably non-uniformity of a plasma energy density distribution throughout the surface of the metallic electrode 40. Thus, the probability of the discharge coming into contact with the gas disadvantageously decreases significantly. In contrast, when the percent surface coverage is less than 20%, the intended effect of the present invention cannot be attained.

As described above, when a plasma discharge is induced by use of the planar metallic plate electrode 40 on which metallic microparticles 41 of high-thermoelectron-emission property are dispersively deposited, the charge distribution throughout the metallic electrode 40 is caused to be non-uniform. As a result, discharge pillars similar to localized concentrated discharges are produced from points corresponding to the dispersed metallic microparticles 41. Thus, a complex barrier discharge in which a mist-like barrier discharge mixed with lightning-like localized concentrated discharges can be produced effectively, to thereby improve the plasma energy level through a synergistic effect of the barrier discharge and the lightning-like localized concentrated discharges.

As a result, when the plasma modification process is applied to harmful gases contained in exhaust gases—such as $NO_2$ and $CO_2$, which are generally stable and require relatively high energy to be decomposed—energy indices such as a plasma current density can be maintained at a level as high as that of a localized concentrated discharge, while the probability that the harmful gases come into contact with plasma is maintained at a high level.

As described in Embodiment 8, when the surface of the second planar metallic electrode 12C, which is one of the opposing electrodes, is uniformly coated with the dielectric body 13C, a more stable uniform barrier discharge can easily be maintained. In addition, when the planar metallic electrode 40 on which metallic microparticles 41 of high-thermoelectron-emission property are dispersively deposited is employed, a plurality of discharge pillars of high current densities similar to localized concentrated discharges are produced from points corresponding to the dispersed metallic microparticles 41 toward the opposing dielectric body 13D. As a result, a complex barrier discharge is produced effectively.

Embodiment 9

In another mode, metallic microparticles of high-secondary-electron-emission property are dispersively deposited as metallic microparticles 41 instead of those having high-thermoelectron-emission property according to the above-described Embodiment 8. As a result, an effect similar to that attained in Embodiment 8 can also be attained.

In other words, when metallic microparticles of high-secondary-electron-emission property are dispersively deposited as metallic microparticles 41, a plurality of discharge pillars of high current densities similar to localized concentrated discharges are produced in barrier discharge, to thereby attain a complex barrier discharge.

Examples of preferred materials for the metallic microparticles of high-secondary-electron-emission property include magnesium oxides, cesium-containing material, copper-beryllium, silver-magnseium, rubidium-containing material, and calcium oxide.

These materials may be used in combination of two or more species.

Embodiment 10

In another mode, metallic microparticles having a low glow-cathode-fall voltage and having a high-electron-emission property are dispersively deposited on the surface of a planar metallic electrode installed in a gas modification reactor. As a result, an effect similar to that attained in the case in which metallic microparticles of high-thermoelectron-emission property are dispersively deposited can be attained.

In other words, when metallic microparticles having a low glow-cathode-fall voltage and having a high-electron-emission property are dispersively deposited as metallic microparticles 41, a plurality of discharge pillars of high current densities similar to localized concentrated discharges are formed in barrier discharge, to thereby attain a complex barrier discharge.

Examples of preferred materials for the metallic microparticles having a low glow-cathode-fall voltage and having a high-electron-emission property include magnesium oxides, cesium-containing material, copper-beryllium, silver-magnseium, rubidium-containing material, and calcium oxide.

These materials may be used in combination of two or more species.

In complex barrier discharge in which a plurality of discharge pillars similar to localized concentrated discharge of high quantity of light are formed, a gas to be treated in contact with discharge pillars undergoes reaction at high efficiency due to high plasma energy. In addition, a gas to be treated in contact with a barrier discharge partially undergoes reaction, and the unreacted gas is pre-excited to be elevated to a more reactive state.

Furthermore, metallic microparticles which are dispersively deposited on a metal surface can be regulated so as to regulate the size and the amount of a plurality of discharge pillars formed among a barrier discharge. In other words, the plasma energy density of the overall discharge can be regulated. When the plasma energy density is regulated in accordance with the reactant gas system to be modified, the plasma modification process can be performed with lower electric power in a highly efficient manner.

Specific Test Examples of the present invention will next be described, which should not be construed as limiting the invention thereto.

TEST EXAMPLE 8

The apparatus as shown in FIG. 23 was used. The proportion (i.e.; the percent surface coverage) of metallic microparticles of high-thermoelectron-emission property dispersively deposited on the surface was varied, to thereby modify complex barrier discharge. Variation of $NO_X$ gas decomposition depending on the complex barrier discharge state—changed depending on the percent surface coverage—was examined.

In Test Example 8, tungsten particles having a metallic particle size of 5 $\mu$m were employed as the metallic microparticles of high-thermoelectron-emission property.

Figure 25:
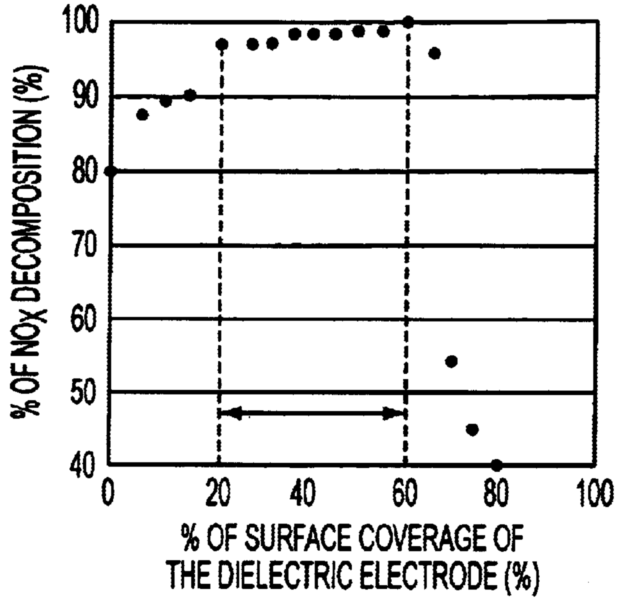
FIG. 25 is a graph showing the relationship between the surface coverage of metallic microparticles having a high thermoelectron-emission property and the decomposition rate of $NO_X$.

FIG. 25 shows the relationship between the percent surface coverage of the metallic microparticles of high-thermoelectron-emission property and the percentage of $NO_X$ decomposition.

Particles having a particle size of 5 $\mu$m were employed. The percent surface coverage of "0%" corresponds to a conventional apparatus.

As is clear from FIG. 25, excellent $NO_X$ decomposition efficiency can be attained when the percent surface coverage falls within the range of 20–60%.

TEST EXAMPLE 9

The procedure of Test Example 8 was repeated, except that instead of $NO_X$ gas, $CO_2$ was used as the gas to be decomposed.

Figure 26:
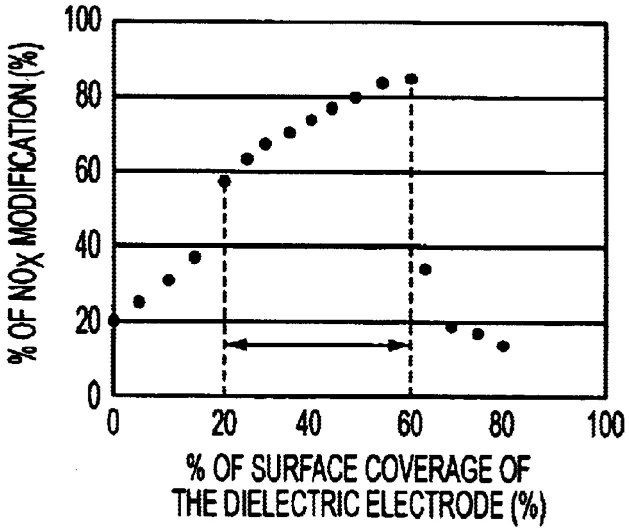
FIG. 26 is a graph showing the relationship between the surface coverage of metallic microparticles having a high thermoelectron-emission property and the decomposition percentage of $CO_2$.

The results are shown in FIG. 26.

As is clear from FIG. 26, excellent $CO_2$ decomposition efficiency can be attained when the percent surface coverage falls within the range of 20–60%.

TEST EXAMPLE 10

The $CO_2$ decomposition procedure of Test example 9 was repeated, except that the particle size of the metallic microparticles was varied, to thereby determine the gas modification percentage.

The percent surface coverage was set at 60%.

Figure 27:
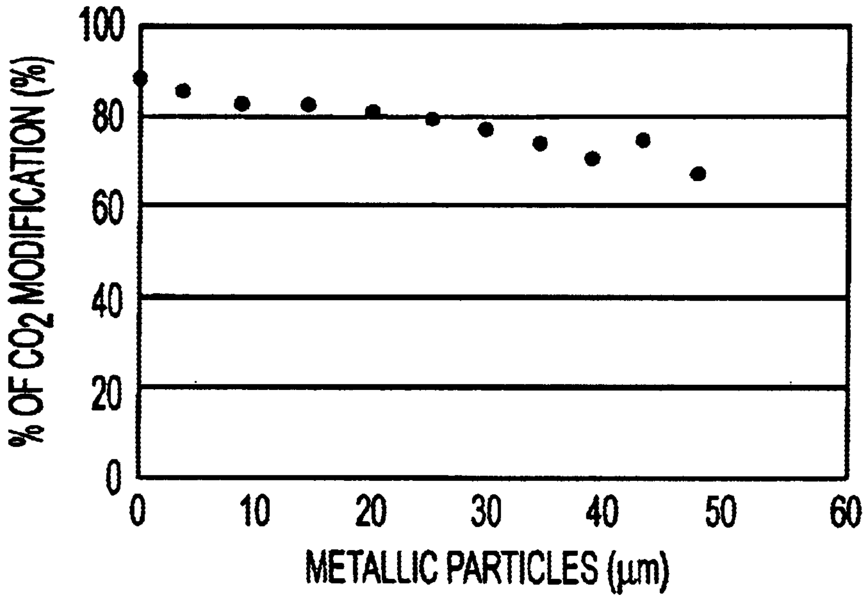
FIG. 27 is a graph showing the relationship between the particle size of metallic microparticles having a high thermoelectron-emission property and the decomposition percentage of $CO_2$.

The results are shown in FIG. 27.

As is clear from FIG. 27, when the percent surface coverage is held constant, the smaller the size of the metallic particles, the more often the lightning-like discharges are formed, and the probability that $CO_2$ gas comes into contact with one of the discharges increases, thereby improving gas modification efficiency.

TEST EXAMPLE 11

The $CO_2$ decomposition procedure of Test Example 9 was repeated, except that the dispersal state of the metallic microparticles was varied, to thereby measure gas modification percentage.

In one case, metallic microparticles 41 were not uniformly distributed throughout the surface of the planar metallic electrode 40, to thereby yield a concentrated part. In the other case, metallic microparticles 41 were uniformly dispersed throughout the surface of the planar metallic electrode 40.

Figure 28A:
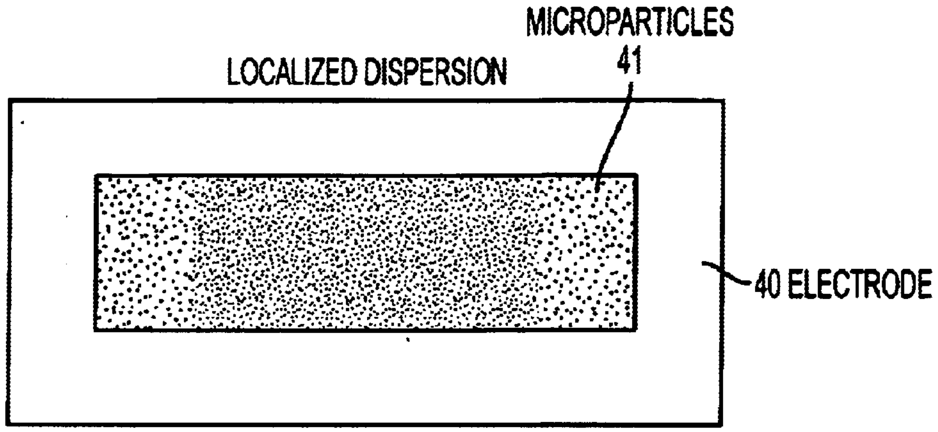
FIGS. 28A and 28B show dispersion states of metallic electrodes on which metallic microparticles have been dispersively deposited.
Figure 28B:
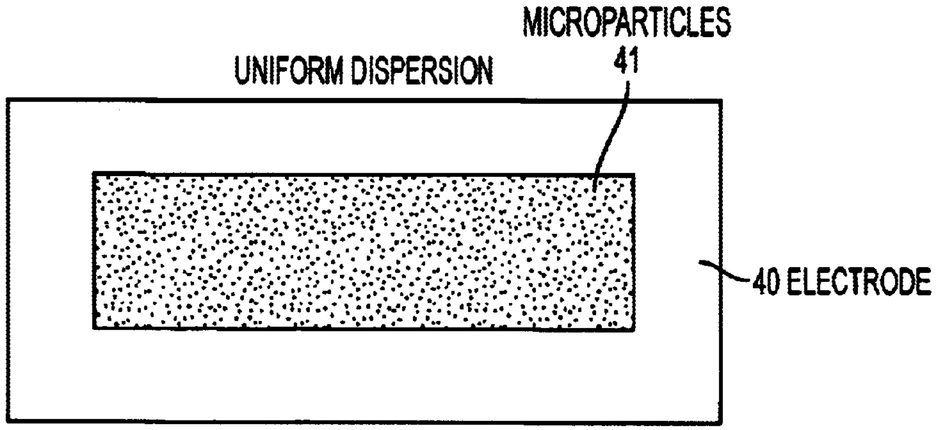

The dispersion states of metallic microparticles dispersively deposited on metallic electrodes are shown in FIG. 28.

In this Test Example, metallic microparticles having a particle size of 5 μm were employed.

Figure 29:
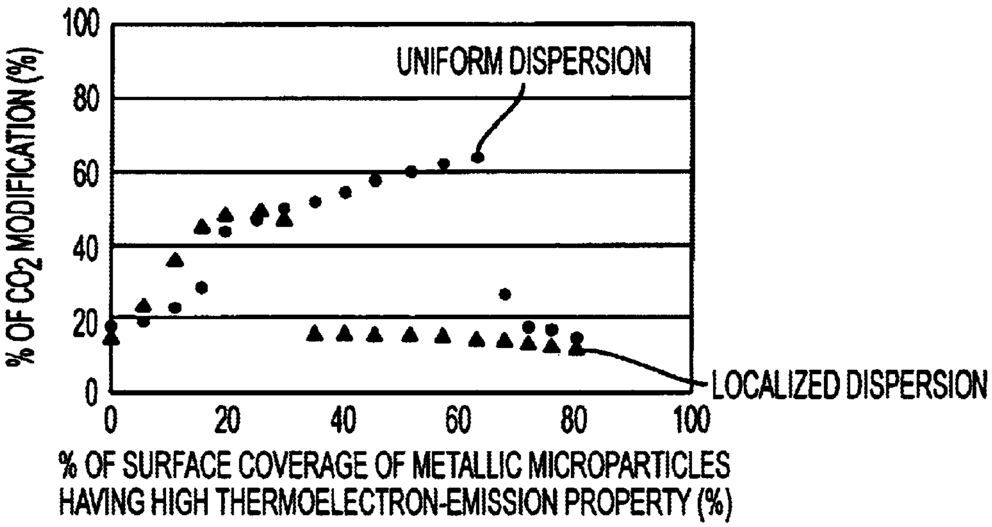
FIG. 29 is a graph showing the relationship between the surface dispersion state of metallic microparticles of high thermoelectron-emission property and the decomposition percentage of $CO_2$.

The results are shown in FIG. 29.

As is clear from FIG. 29, unless the discharge state transits to a localized concentrated discharge, the $CO_2$ modification percentage increases as the percent surface coverage increases, both in the cases of the electrode on which metallic microparticles 41 were dispersed non-uniformly so as to yield a concentrated part (see FIG. 28(*a*)) and of the electrode on which metallic fine particles 41 were uniformly dispersed (FIG. 28(*b*)).

In addition, the difference in the dispersion state of metallic microparticles has been found to be expressed as the critical percent surface coverage at which a discharge transforms into a localized concentrated discharge; i.e., 35% (non-uniform dispersion with a concentrated part) or 65% (uniform dispersion).

When the percent surface coverage is as low as approximately 20–25%, the decomposition percentage attained through the non-uniform dispersion with a concentrated part is higher than that attained through uniform dispersion. However, when the percent surface coverage is 25% or higher, better results can be attained through uniform dispersion. Therefore, on the whole, uniform dispersion is preferred.

According to Embodiments 8 to 10, metallic microparticles are dispersively deposited on the surface of one of the electrodes facing opposite each other. When a high voltage is applied between the electrodes, a complex barrier discharge is induced. Therefore, gases such as $CO_2$ and $NO_X$ can be decomposed efficiently.

What is claimed is:

1. A plasma reactor for modifying gas by plasma, comprising:

a first planar electrode and a second planar electrode, the two electrodes facing opposite each other approximately in parallel;

a dielectric body inserted between the first and the second electrodes; and a complex barrier discharge-generating means for providing a predetermined electric potential difference between the first and the second electrodes;

wherein the dielectric body has specific dielectric constant, such that complex barrier discharge is induced in a space between the first or the second electrode and the dielectric body when a predetermined voltage is applied between the first electrode and the second electrode, so as to apply complex plasma discharge to the gas to be treated fed between the electrodes, to thereby modify the gas.

2. A plasma reactor according to claim 1, wherein the ratio of the width (W) to the length (L) of the first and second electrodes is predetermined in accordance with modification reaction of the gas to be treated, the width (W) being approximately perpendicular to the direction for feeding the gas to be treated and the length (L) being along the direction.

3. A plasma reactor according to claim 2, wherein the relationship between W and L is adjusted to W≧L when the modification reaction is a single-step reaction.

4. A plasma reactor according to claim 2, wherein the relationship between W and L is adjusted to W≦L when the modification reaction includes multiple reaction steps.

5. A plasma reactor according to claim 1, wherein positions of voltage application to the first and the second electrodes are offset from a central position with respect to the direction of the flow of the gas to be treated.

6. A plasma reactor according to claim 5, wherein the positions of voltage application to the first and the second electrodes differ from each other with respect to the direction of the flow of the gas to be treated.

7. A plasma reactor according to claim 6, which is for treatment of a gas of a substance which has a low dissociation energy and which can be decomposed by low-density plasma.

8. A plasma reactor according to claim 7, which is for treatment of $NO_X$.

9. A plasma reactor according to claim 5, wherein the positions of voltage application to the first and the second electrodes are identical to each other with respect to the direction of the flow of the gas to be treated; face opposite each other; and are offset upstream from a central position with respect to the direction of the flow of the gas to be treated.

10. A plasma reactor according to claim 9, which is for treatment of a gas of a substance which has a high dissociation energy and which can be decomposed by high-density plasma.

11. A plasma reactor according to claim 10, which is for treatment of $CO_2$ fed to the reactor.

12. A plasma reactor according to claim 1, wherein a plurality of projections are formed on one or both surfaces of the dielectric body.

13. A plasma reactor according to claim 12, wherein a plurality of units are stacked, the units being formed from the first and the second electrodes and the dielectric body inserted between the electrodes.

14. A plasma reactor according to claim 13, wherein the units adjacent to each other share at least one electrode.

15. A plasma reactor according to claim 12, wherein the projections formed on the surface of the dielectric body have a cross-sectional shape selected from the group of a rhombus, a polygon, a circle, and an ellipse.

16. A plasma reactor according to claim 12, wherein the projections formed on the surface of the dielectric body are of different heights.

17. A plasma reactor according to claim 12, wherein the dielectric body is not in contact with at least one of the first and the second electrodes.

18. A plasma reactor according to claim 12, wherein the dielectric body is in contact with the first and the second electrodes.

19. A plasma reactor according to claim 1, wherein metallic microparticles are dispersively deposited on the surface of the first electrode, to thereby induce complex barrier discharge through the application of high voltage.

20. A plasma reactor according to claim 19, wherein the dielectric body is stacked on the surface of the second electrode.

21. A plasma reactor according to claim 19, wherein the metallic microparticles have a high thermoelectron-emission property.

22. A plasma reactor according to claim 21, wherein the metallic microparticles are formed of at least one metal selected from the group consisting of tungsten, platinum, thallium, niobium, nickel, zirconium, cesium, and barium.

23. A plasma reactor according to claim 19, wherein the metallic microparticles have a high secondary-electron-emission property.

24. A plasma reactor according to claim 19, wherein the metallic microparticles provide a small glow-cathode-fall voltage and have a high secondary-electron-emission property.

25. A plasma reactor according to claim 19, wherein the metallic microparticles are formed of at least one species selected from the group consisting of magnesium oxide, cesium-containing material, copper-beryllium, silver-magnesium, rubidium-containing material, and calcium oxide.

26. A plasma reactor according to claim 19, wherein the metallic microparticles are dispersed in a uniform manner or in a localized manner.

27. A plasma reactor according to claim 19, wherein the surface coverage by the dispersively deposited metallic microparticles is 20–60%.

28. A method for modifying gas by plasma, comprising:

feeding a gas to be treated into a space between the first and the second electrodes and applying complex plasma discharge to the gas, to thereby cause gas modification reaction, the two electrodes oppositely facing each other in parallel; the dielectric body disposed between the first and the second electrodes; and the dielectric body having a specific dielectric constant such that complex barrier discharge is induced in a space between the first or the second electrode and the dielectric body upon application of voltage between the first and the second electrodes.

29. A method for reforming gas by plasma according to claim 28, wherein metallic microparticles are caused to be dispersively deposited on the surface of at least one of the first and the second electrodes, to thereby induce complex barrier discharge through application of high voltage.

30. A method for modifying gas by plasma, comprising:

feeding a gas to be treated into a space between the first and the second electrodes and applying complex plasma discharge to the gas, to thereby cause gas modification reaction, the two electrodes oppositely facing each other in parallel; the dielectric body disposed between the first and the second electrodes; and the dielectric body having a specific dielectric constant such that complex barrier discharge is induced in a space between the first or the second electrode and the dielectric body upon application of voltage between the first and the second electrodes, wherein the ratio of the width (W) to the length (L) of the first and second electrodes is predetermined in accordance with modification reaction of the gas to be treated, the width (W) being approximately perpendicular to the direction for feeding the gas to be treated and the length (L) being along the direction.

31. A method for modifying gas by plasma according to claim 30, wherein the relationship between W and L is adjusted to $W \geqq L$ when the modification reaction is a single-step reaction.

32. A method for modifying gas by plasma according to claim 30, wherein the relationship between W and L is adjusted to $W \leqq L$ when the modification reaction includes multiple reaction steps.

33. A method for modifying gas by plasma according to claim 30, wherein high voltage is applied, the positions of voltage application to the first and the second electrodes being offset from a central position with respect to the direction of the flow of the gas to be treated.

34. A method for reforming gas by plasma according to claim 33, wherein high voltage is applied, the positions of voltage application to the first and the second electrodes differing from each other with respect to the direction of the flow of the gas to be treated.

35. A method for reforming gas by plasma according to claim 33, wherein high voltage is applied, the positions of voltage application to the first and the second electrodes being identical to each other with respect to the direction of the flow of the gas to be treated; facing opposite each other; and being offset upstream from a central position with respect to the direction of the flow of the gas to be treated.

36. A plasma reactor for modifying gas by plasma, comprising:

a first planar electrode and a second planar electrode, the two electrodes facing opposite each other approximately in parallel;

a dielectric body inserted between the first and second electrodes; and a complex barrier discharge-generating means for inducing complex barrier discharge in the space between the first or the second electrode and the dielectric body, the dielectric body having a specific dielectric constant such that complex barrier discharge is induced when a predetermined voltage is applied between the first electrode and the second electrode, so as to apply complex plasma discharge to the gas to be treated fed between the electrodes, to thereby modify the gas.

* * * * *